(No Model.)
A. DOW.
ELECTRO GALVANIC BELT.
No. 427,468. Patented May 6, 1890.
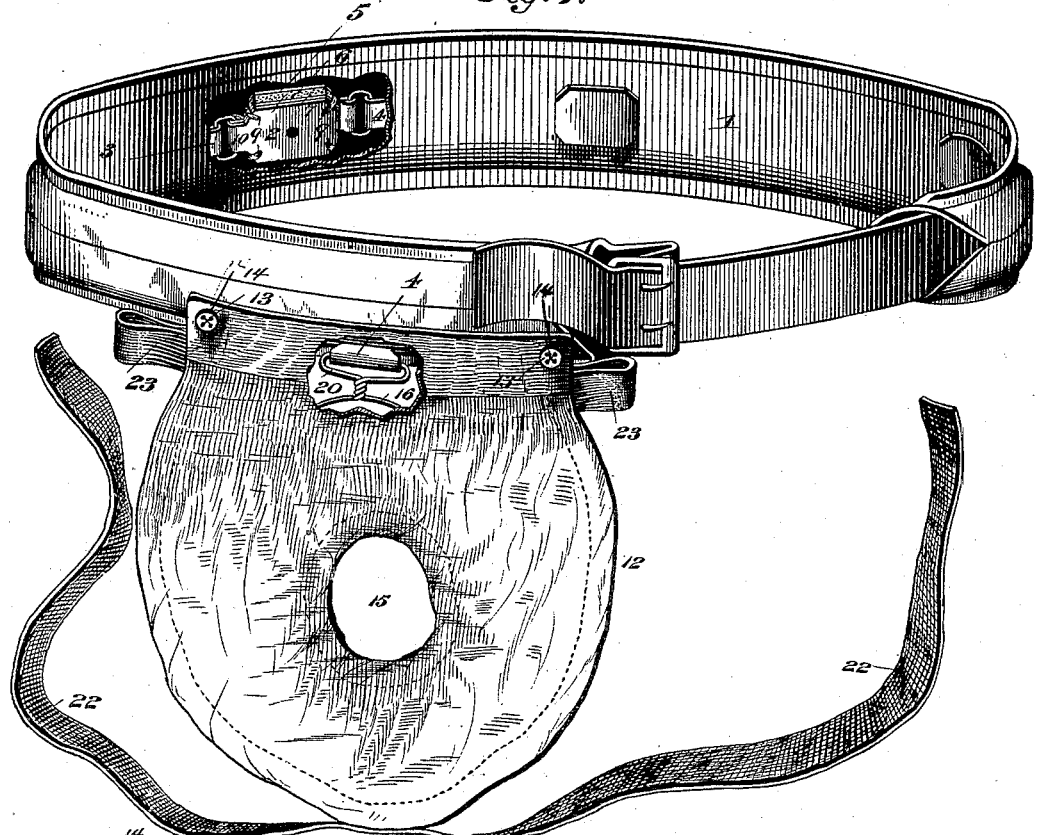
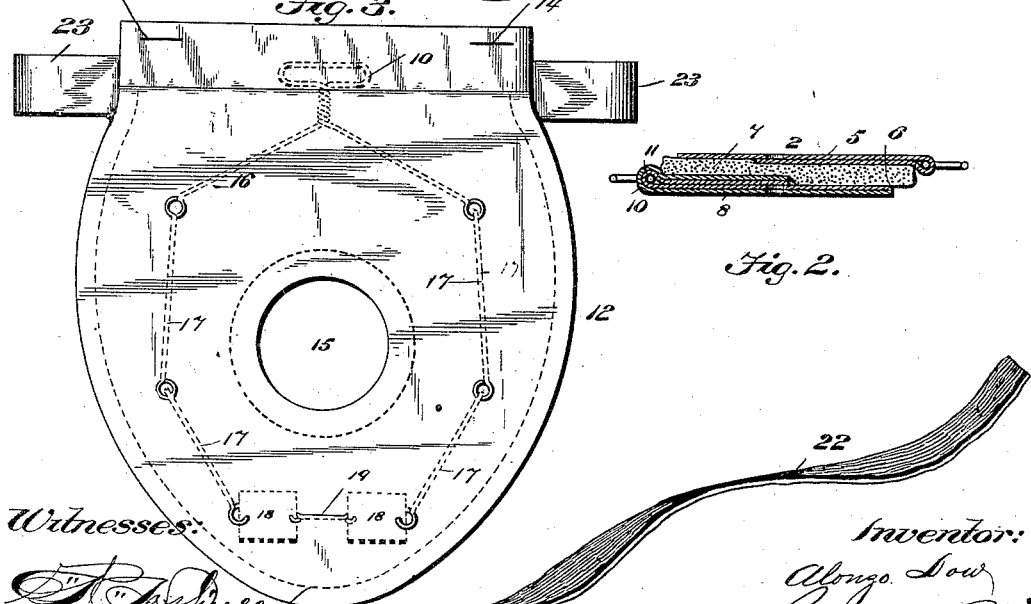
Witnesses:
Inventor:
Alonzo Dow
By Edson Bros,
Attorneys

UNITED STATES PATENT OFFICE.

ALONZO DOW, OF WOOSTER, OHIO, ASSIGNOR OF ONE-HALF TO ROLAN N. WARREN, OF SAME PLACE.

ELECTRO-GALVANIC BELT.

SPECIFICATION forming part of Letters Patent No. 427,468, dated May 6, 1890.

Application filed September 28, 1889. Serial No. 325,388. (No model.)

*To all whom it may concern:*

Be it known that I, ALONZO DOW, a citizen of the United States, residing at Wooster, in the county of Wayne and State of Ohio, have invented certain new and useful Improvements in Electro-Galvanic Belts; and I do hereby declare the following to be a full, clear, and exact description of the invention, such as will enable others skilled in the art to which it appertains to make and use the same.

My invention relates to improvements in electro-galvanic belts, which will be hereinafter fully described and claimed.

In a prior patent issued to me on July 23, 1889, and numbered 407,473, for galvanic belts, I employ an electrode composed of parallel plates of zinc and copper and an intermediate absorbent pad, which are united laterally together by suitable fastenings, one end of one plate of the electrode being provided with an integral tongue that is bent to form one member of the hinge or joint to adapt the electrode to be coupled to other electrodes of the series which form the battery. I have found by practical experiments that the zinc plate or element of the electrode is liable to rapid deterioration by the action of a strong exciting-fluid—as, for instance, acid cider vinegar—and one of the objects of my present invention is to provide means for protecting in a measure the zinc element from the exciting-fluid, in order to increase its durability without impairing its efficiency. This end is accomplished by means of a sheet-metal plate of tin or sheet-iron, which conforms, preferably, to the shape and size of the zinc element, and is applied laterally and directly against one side (the outer face) of said zinc element, while the absorbent pad is applied to the other side of the zinc plate, the several plates and pad of the electrode being united together by the transverse fastening devices. The tin or sheet-metal plates serve to protect one side of the zinc element of the electrode from the action of the exciting-fluid when the pad is saturated, which ordinarily is accomplished by immersing the entire electrode bodily in the exciting-fluid, and the tongue that forms a part of the joint or hinge of the electrode is made integral with the sheet-metal (tin or iron) plate, as the latter is more durable than the zinc element.

The second part of my invention consists of a suspensory attachment for a galvanic belt, which is provided with electrodes that are connected in circuit with the electrodes or battery of the belt proper. The suspensory is detachably connected in any suitable way to the belt, and the connection between the wires that lead from the battery of the belt to the electrodes in the suspensory is such that the circuit of the suspensory can be easily connected or disconnected with the battery. In order to provide the necessary flexibility in the circuit of the suspensory to adapt the latter to fit properly to the person without unduly pressing upon or chafing the person, the circuit is composed of a series of flexibly-jointed sections or loops of wire that connect to the electrodes in the suspensory and to a single loop, which is fitted over a hook on one of the end electrodes of the battery carried by the belt.

To enable others to more readily understand my invention, I will now proceed to a detailed description thereof, in connection with the accompanying drawings, in which—

Figure 1 is a view of the belt with my suspensory attached thereto. Fig. 2 is an enlarged detail sectional view of one of the electrodes of the battery supported by the belt. Fig. 3 is a detail view of the suspensory detached from the belt.

Referring to the drawings, in which like numerals of reference denote corresponding parts in all the figures, 1 designates the inclosing-sheath of my improved electro-galvanic belt, in which is inclosed a series of electrodes 2, that are connected together and to the contact-plates 3 4 to form a battery for applying currents of electricity to the human body, the arrangement of said parts being essentially the same as the device shown and described in my prior patent hereinbefore referred to. Each electrode 2 consists of three plates and an absorbent pad, instead of two plates and the pad, as in the electrode described and claimed in my prior patent, the elements or plates of copper and zinc being designated by the numerals 5 6, respectively, the absorbent pad by the numeral 7, and the sheet-metal protection-plate by the numeral 8. The protection-plate for the zinc element, which is made of tin or sheet-iron, conforms to the shape and size, approximately, of the zinc element, and it is arranged against the outer exposed face thereof, (see Fig. 2,) all the parts being united laterally together by the transverse fastening means 9. The sheet-metal protection-plate 8 is further provided with a tongue 10, which is bent around to form an eye to receive the hinge-loop to connect one electrode to the other, and the zinc plate is also provided with a tongue 11, which is arranged within the tongue of the tin or sheet-iron protection-plate.

The suspensory 12 consists of a suitably-shaped bag of textile or woven fabric or any other suitable material, which is connected to the belt 1 in any preferred manner, so that it can be readily removed therefrom—as, for instance, by means of the buttons 13 on the belt, which fit in the eyes or holes 14 on the suspensory; but it is obvious that this means for connecting the suspensory can be varied within wide limits without departing from the spirit of my invention.

The suspensory is provided with a central aperture 15, and around this aperture, at a suitable distance therefrom, is arranged a circuit 16, composed of a conductor 17 and the electrodes 18, which circuit is connected or coupled to the battery of the belt, said electrodes and the conductor being housed or concealed within a suitable sheath, which is attached to the suspensory 12; or the latter may be woven to receive said parts.

To provide the necessary flexibility in the conductor, it is made up of a series of flexibly-connected wire links or loops of copper or other suitable metal, the conductor being also flexibly connected to the electrodes 18, which are in turn connected with each other by an intermediate wire 19.

In practice I prefer to connect the conductor with the contact 4 of the battery by a wire loop 20, which is located above the central opening 15 in the suspensory, and at a diametrically-opposite point in the suspensory, below the central opening therein, is located the electrodes 18; but it is evident that this arrangement can be varied and the electrodes arranged in the circuit at any convenient point, and the number of the electrodes can be increased or diminished, as desired.

The connecting-loop 20 is secured in any suitable manner to the conductor, and it is fitted over a hook 4' on the contact-plate 4 of the battery, to couple or connect the conductor to the battery, so that a current passes from the battery to the electrodes. It is evident that the suspensory can be readily and easily disconnected from the belt and the connecting-wire 20 unhooked from the contact-plate 4 of the belt when desired, and that said parts can be as readily connected to the belt for use.

The suspensory is sustained in place by the belt and by means of cords or bands 22, which are secured to the opposite side of the suspensory from where it is connected to the belt, said cords or bands being passed around the hips of the wearer and secured to the loops 23 at points near the connection of the suspensory to the belt.

Having thus fully described my invention, what I claim as new, and desire to secure by Letters Patent, is—

1. In a galvanic belt, an electrode consisting of the copper and zinc elements, an absorbent pad interposed between said elements, and a protection-plate, substantially as described, applied laterally against the exposed face of the zinc element, the whole being suitably secured together by transverse fastenings, as set forth.

2. In a galvanic belt, an electrode consisting of the zinc and copper elements, an absorbent pad interposed between said elements, and a protection-plate applied laterally against the exposed face of the zinc element, and having a tongue which is bent to form an eye, for the purpose described, substantially as set forth.

3. The combination, with a belt having a battery and a contact-plate, of a suspensory detachably connected to the belt, the electrodes, and a conductor connected to the electrodes and detachably connected to the contact-plate, substantially as described, for the purpose set forth.

4. The combination, with a belt having a battery and a contact-plate, of a suspensory detachably connected to the belt, the electrodes, and a flexibly-jointed conductor permanently connected to the electrodes and detachably connected to the contact-plate, substantially as described, for the purpose set forth.

5. The combination, with a belt having a battery and a contact-plate, of a suspensory detachably connected to the belt, the electrodes flexibly connected together, a conductor made up of flexibly-connected wires which are connected to the electrodes, and a loop secured to the conductor and detachably connected to the contact-plate, substantially as described.

In testimony whereof I affix my signature in presence of two witnesses.

ALONZO DOW.

Witnesses:
L. HUMPHREY,
O. HUMPHREY.